(12) United States Patent
Kim et al.

(10) Patent No.: US 11,743,845 B2
(45) Date of Patent: Aug. 29, 2023

(54) RADIO COMMUNICATION SYSTEM, RADIO DEVICE, AND COMPUTER PROGRAM PRODUCT

(71) Applicant: KABUSHIKI KAISHA TOSHIBA, Tokyo (JP)

(72) Inventors: Suh Wuk Kim, Ota Tokyo (JP); Yu Yu, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 190 days.

(21) Appl. No.: 17/184,425

(22) Filed: Feb. 24, 2021

(65) Prior Publication Data

US 2022/0086779 A1 Mar. 17, 2022

(30) Foreign Application Priority Data

Sep. 11, 2020 (JP) ................. 2020-153344

(51) Int. Cl.
*H04W 56/00* (2009.01)
*H04W 72/0446* (2023.01)
*H04L 45/122* (2022.01)

(52) U.S. Cl.
CPC ....... *H04W 56/0005* (2013.01); *H04L 45/122* (2013.01); *H04W 72/0446* (2013.01)

(58) Field of Classification Search
CPC ......... H04W 56/0005; H04W 72/0446; H04W 72/044; H04L 45/122; Y02D 30/70
See application file for complete search history.

(56) References Cited

U.S. PATENT DOCUMENTS

| 2012/0320790 A1* | 12/2012 | Shaffer | H04W 40/28 370/254 |
| 2013/0121335 A1* | 5/2013 | Hui | H04L 12/18 370/390 |
| 2016/0262102 A1* | 9/2016 | Sakata | H04L 5/0078 |

FOREIGN PATENT DOCUMENTS

| JP | 2010-233072 A | 10/2010 |
| JP | 2016-163305 | 9/2016 |
| JP | 2018-121366 A | 8/2018 |
| JP | 6471005 B2 | 2/2019 |
| JP | 6524304 B2 | 6/2019 |

* cited by examiner

*Primary Examiner* — Jae Y Lee
*Assistant Examiner* — Aixa A Guadalupe Cruz
(74) *Attorney, Agent, or Firm* — Finnegan, Henderson, Farabow, Garrett & Dunner, LLP

(57) ABSTRACT

A radio communication system according to an embodiment includes a plurality of radio devices constituting a multi-hop network. The radio devices each include a hardware processor and perform management by synchronizing a timing of an uplink period including X frames and a timing of a downlink period including Y frames. X and Y are different values. The radio devices each allocate the hop count of each radio device of the plurality of radio devices to at least one frame in the uplink period and at least one frame in the downlink period. The radio devices each transmit uplink data in the frame to which the hop count of the own radio device is allocated in the uplink period. The radio devices each transmit downlink data in the frame to which the hop count of the own radio device included in the downlink period is allocated.

12 Claims, 17 Drawing Sheets

RADIO COMMUNICATION SYSTEM, RADIO DEVICE, AND COMPUTER PROGRAM PRODUCT

CROSS-REFERENCE TO RELATED APPLICATIONS

This application is based upon and claims the benefit of priority from Japanese Patent Application No. 2020-153344, filed on Sep. 11, 2020; the entire contents of which are incorporated herein by reference.

FIELD

Embodiments described herein relate generally to a radio communication system, a radio device, and a computer program product.

BACKGROUND

Widely known are radio communication systems that connect sensors or the like that monitor social infrastructure or natural environment using a plurality of radio devices constituting a multi-hop network. These radio communication systems can monitor an object at a lower cost because the radio communication systems enable the sensors and the radio devices to be installed at places difficult for people to frequently visit, such as mountainous regions. However, for these radio communication systems, electric power saving for the radio devices is in demand. To save electric power of the radio devices, the radio communication systems bring the radio devices into a sleep state as much as possible except when transmitting and receiving data.

The radio communication systems are required to enable the radio devices to be controlled and firmware to be updated from remote areas, for example. To meet the demand, the radio communication systems need to schedule a communication slot for an uplink and a communication slot for a downlink on each radio device. The communication slot for the uplink is used to transmit sensor data generated by the radio device to an aggregation device. The communication slot for the downlink is used to transmit control data generated by the aggregation device to the radio device on the downstream. If the communication slot for the uplink and the communication slot for the downlink are set to different timings, the number of transmissions performed by the radio device increases compared to the case where only the communication slot for the uplink is scheduled. As a result, the sleep state for the radio device is shortened leading to an increase in power consumption, thereby shortening the battery life, for example.

There has been developed a scheduling method of allocating the communication slot for the uplink and the communication slot for the downlink to the same timing on some of the radio devices, for example. With this method, the some of the radio devices can perform transmission for the uplink and transmission for the downlink at the same timing. As a result, the sleep state for the radio devices can be elongated, thereby suppressing power consumption and extending the battery life, for example.

If this method is employed, however, the radio devices on which the communication slot for the uplink and the communication slot for downlink can be allocated to the same timing are limited to only some of the radio devices included in the radio communication system, and this state continues. If a battery of one of the radio devices runs out in the radio communication system constituting a multi-hop network, the battery needs to be replaced by a person. As such, the radio communication system needs to lower entire power consumption of radio devices evenly, not lowering the power consumption of some of the radio devices. To achieve this, the radio communication system constituting a multi-hop network is required to reduce the power consumption of the radio devices constituting the multi-hop network while achieving transmission processing for the uplink and transmission processing for the downlink.

DETAILED DESCRIPTION

A radio communication system according to an embodiment includes a plurality of radio devices constituting a multi-hop network. Each of the radio devices is configured to comprise a hardware processor configured to perform management by synchronizing a timing of a frame including a predetermined number of slots corresponding to a predetermined time length. Each of the radio devices (or the hardware processor) is exclusively associated with at least one of the slots included in the frame. Each of the radio devices enables data to be transmitted in the slot associated with an own radio device in the frame. Each of the radio devices performs management by synchronizing a timing of an uplink period including predetermined X frames and a timing of a downlink period including predetermined Y frames, where X is an integer of 2 or larger and Y is an integer of 2 or larger; and X and Y are different values. Each of the radio devices allocates a hop count of each radio device of the plurality of radio devices to at least one of the frames in the uplink period and at least one of the frames in the downlink period according to a predetermined rule, where the hop count indicates the number of radio devices that transmit data on a shortest path for transmitting the data from the radio device serving as a target to the radio device disposed at a root position. In the frame to which the hop count of the own radio device included in the uplink period is allocated, each of the radio devices transmits uplink data in the multi-hop network, and in the frame to which the hop count of the own radio device included in the downlink period is allocated, each of the radio devices transmits downlink data in the multi-hop network. A radio communication system 10 according to exemplary embodiments is described below with reference to the accompanying drawings.

First Embodiment

Figure 1:
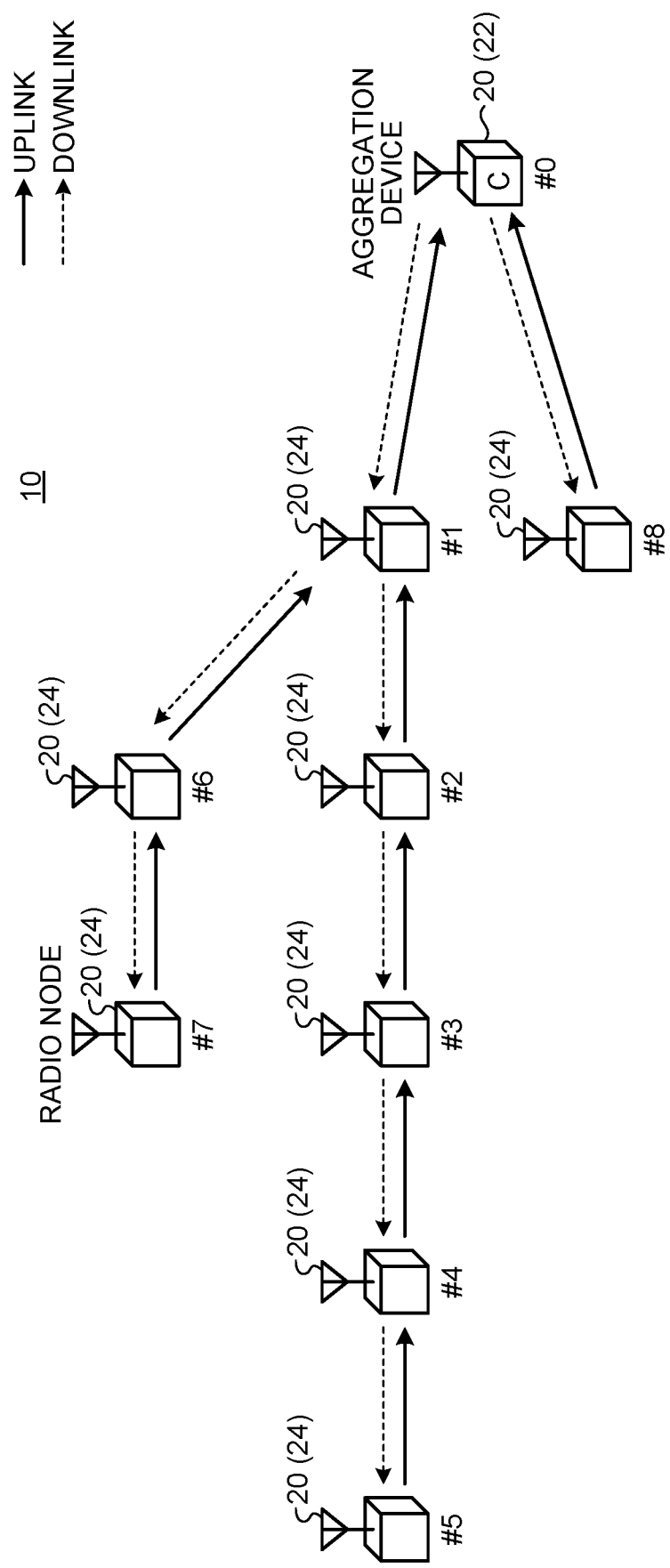
FIG. 1 is a diagram of the configuration of a radio communication system according to a first embodiment.

FIG. 1 is a diagram of the configuration of the radio communication system 10 according to a first embodiment. The radio communication system 10 includes a plurality of radio devices 20.

The radio devices 20 constitute a multi-hop network having a tree structure. The radio device 20 disposed at the root position of the tree structure out of the radio devices 20 is referred to as an aggregation device 22. The radio devices 20 disposed at positions other than the root position out of the radio devices 20 are referred to as radio nodes 24.

The radio nodes 24 are each connected to one radio device 20 on the upstream by radio communications. The aggregation device 22 and the radio nodes 24 are each connected to one or a plurality of radio devices 20 on the downstream by radio communications. The radio nodes 24 on the most downstream (radio nodes 24 disposed at the leaf positions) each have no radio device 20 connected thereto by radio communications on the downstream.

An uplink denotes a radio path for transmitting data from a radio node 24 on the downstream to the aggregation device 22 or a radio node 24 on the upstream. A downlink denotes a radio path for transmitting data from the aggregation device 22 or a radio node 24 on the upstream to a radio node 24 on the downstream.

The multi-hop network transmits data from a source radio device 20 to a destination radio device 20 not directly connected thereto by radio communications by relaying the data via other radio devices 20. In other words, the multi-hop network transfers data by a bucket-brigade system.

The radio devices 20 perform radio communications by a predetermined radio communication system. The radio communication system is a local area network (LAN), such as Institute of Electrical and Electronics Engineers (IEEE) 802.11 a/b/g/n/ac. The radio communication system may be Bluetooth (registered trademark), Zigbee (registered trademark), or 920 MHz-band radio communications, for example. The radio communication system may be a communication system of other radio standards used for the LAN or a personal area network (PAN), for example.

The radio devices 20 are each supplied with unique identification information. In the example illustrated in FIG. 1, nine radio devices 20 are provided. The nine radio devices 20 are supplied with respective pieces of identification information of #0, #1, #2, #3, #4, #5, #6, #7, and #8.

The radio devices 20 may constitute a multi-hop network having another structure instead of the multi-hop network having the tree structure. In this case, any one of the radio devices 20 functions as the aggregation device 22. The shortest path from a radio device 20 other than the aggregation device 22 to the aggregation device 22 is referred to as the uplink, and the path toward the opposite direction is referred to as the downlink. One of the communication paths formed between two aggregation devices 22 is the uplink, and the other is the downlink.

Figure 2:
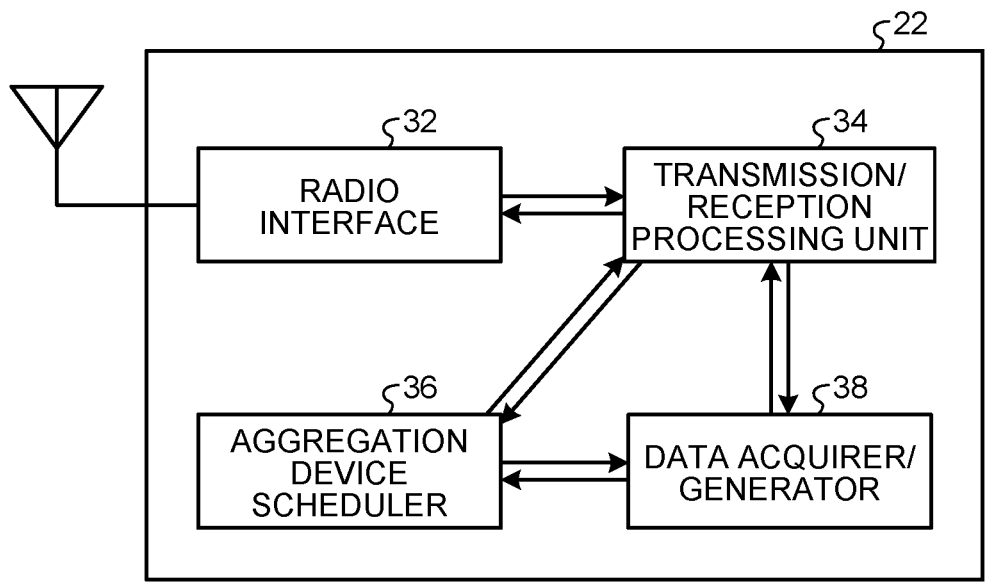
FIG. 2 is a diagram of the configuration of an aggregation device.

FIG. 2 is a diagram of the configuration of the aggregation device 22. The aggregation device 22 includes a radio interface 32, a transmission/reception processing unit 34, an aggregation device scheduler 36, and a data acquirer/generator 38.

The radio interface 32 transmits and receives radio signals to and from other radio devices 20 by a predetermined radio communication system. The transmission/reception processing unit 34 performs reception of signals received by the radio interface 32 and transmission of generating packets including transmission data and causing the radio interface 32 to transmit the packets.

The aggregation device scheduler 36 sets a communication period for the uplink, a communication period for the downlink, and a timing of radio transmission, for example, according to a predetermined rule. The data acquirer/generator 38 stores therein uplink data received from the radio nodes 24. The data acquirer/generator 38 generates data to be transmitted in the down direction.

Figure 3:
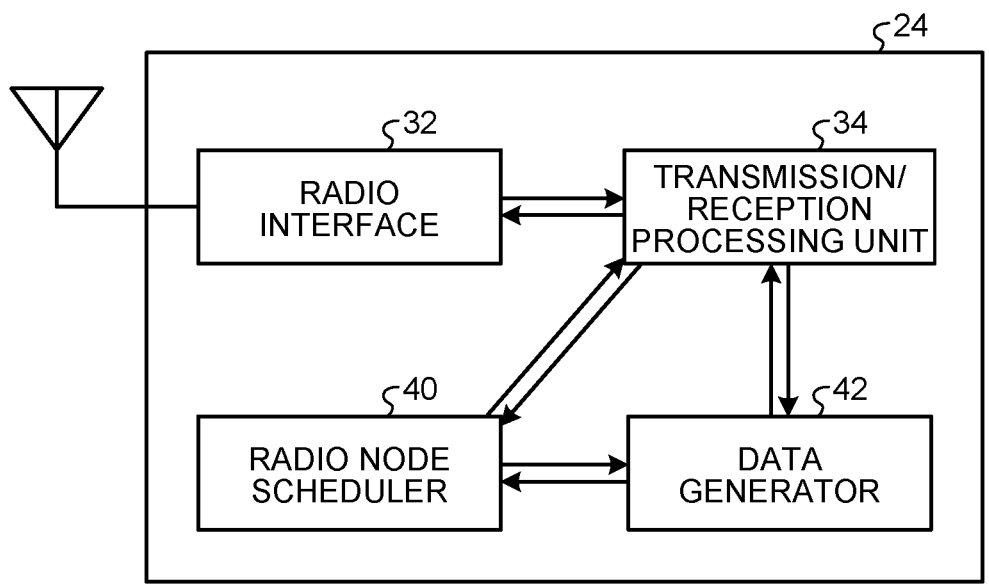
FIG. 3 is a diagram of the configuration of a radio node.

FIG. 3 is a diagram of the configuration of the radio node 24. The radio node 24 includes the radio interface 32, the transmission/reception processing unit 34, a radio node scheduler 40, and a data generator 42.

The radio interface 32 and the transmission/reception processing unit 34 have the same functions as those of the aggregation device 22. The radio node scheduler 40 acquires a communication period for the uplink, a communication period for the downlink, and a timing of radio transmission, for example, from the aggregation device 22 or other radio nodes 24 already connected to the network. The data generator 42 generates data to be transmitted in the up direction and data to be transmitted in the down direction.

Figure 4:
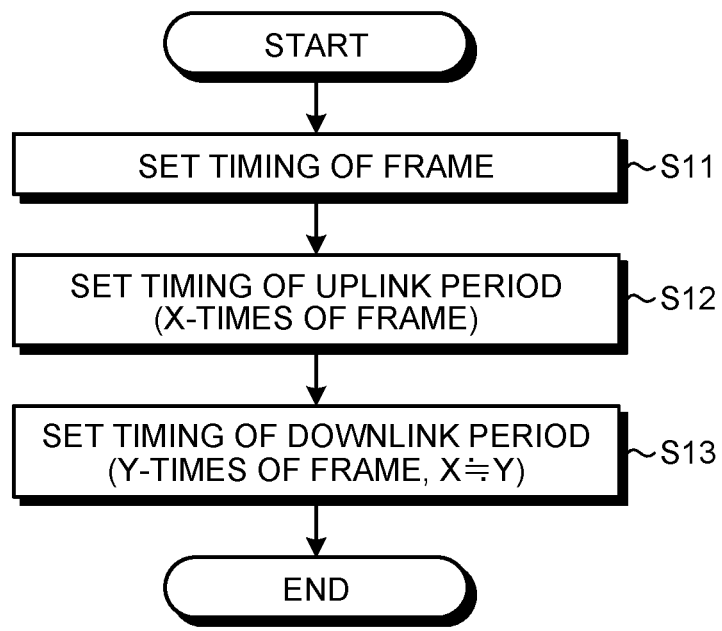
FIG. 4 is a flowchart of setting a communication period.

FIG. 4 is a flowchart of setting a communication period. The aggregation device 22 sets a communication period by the procedure illustrated in FIG. 4 and notifies the radio nodes 24 of the timing of the communication period so as to operate synchronously with the set communication period. In the radio communication system 10, not the aggregation device 22 but any one of the radio nodes 24 may set the communication period and notify the aggregation device 22 and the other radio nodes 24 of the timing of the communication period.

The aggregation device 22 sets a timing of a frame at S11. The frame will be described later in greater detail with reference to FIG. 5.

Subsequently, the aggregation device 22 sets a timing of an uplink period at S12. The uplink period includes a predetermined X frames (X is an integer of 2 or larger). In other words, the uplink period is X-times the time length of the frame.

Subsequently, the aggregation device 22 sets a timing of a downlink period at S13. The downlink period includes predetermined Y frames (Y is an integer of 2 or larger). In other words, the downlink period is Y-times the time length of the frame.

X and Y are different values. The uplink period and the downlink period will be described later in greater detail with reference to FIG. 6.

The aggregation device 22 notifies the radio nodes 24 of the set timing of the frame, the timing of the uplink period, and the timing of the downlink period. The radio nodes 24 that have received the information on the timings may notify other devices of the information. The aggregation device 22 and the radio nodes 24, that is, the radio devices 20 connected to the network each perform management by synchronizing the timing of the frame, the timing of the uplink period, and the timing of the downlink period. As a result, all the radio devices 20 connected to the network can transmit and receive data in the common communication period.

Figure 5:
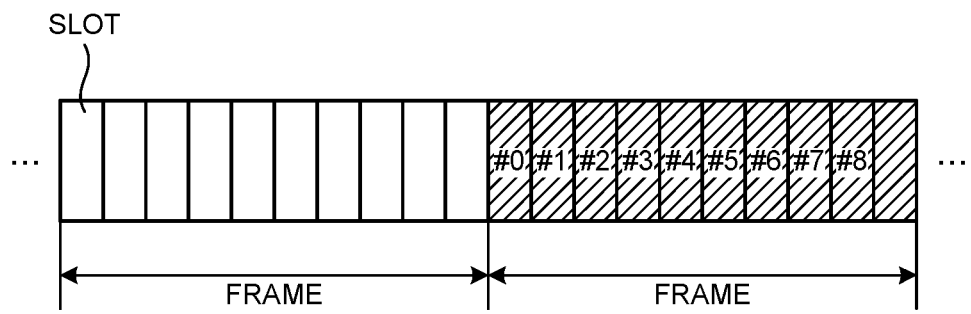
FIG. 5 is a diagram of the structure of a frame.

FIG. 5 is a diagram of the structure of the frame. The frame includes a predetermined number of slots. All the slots are the same time length. Each of the slots is a predetermined time length, such as 100 milliseconds. The slot is a period for one radio device 20 to perform transmission once.

The number of slots included in the frame is equal to or larger than a value obtained by adding one, which is the number of the aggregation device 22, to the number of radio nodes 24. In other words, the number of slots included in the frame is equal to or larger than the number of radio devices 20 connected to the network.

The aggregation device 22 and the radio nodes 24, that is, the radio devices 20 connected to the network are each exclusively associated with at least one of the slots included in the frame. In other words, the slot is associated with any one of the radio devices 20 connected to the network. The slot is not associated with two or more radio devices 20 in a duplicate manner. The frame may include a vacant slot associated with no radio device 20. The frame may include two or more slots associated with the same radio device 20.

The positions of the slots associated with the respective radio devices 20 are fixed in each frame, for example. In the example illustrated in FIG. 5, the first slot in each of the frames is associated with the radio device 20 of #0, the second slot is associated with the radio device 20 of #1, and the ninth slot is associated with the radio device 20 of #8.

The radio devices 20 each enable data to be transmitted in the slot associated with own device in the frame. In other words, each of the radio devices 20 does not enable data to be transmitted in the slot not associated with own device. With this configuration, the radio devices 20 can each transmit data at least once in each frame without interfering with the other radio devices 20.

Figure 6:
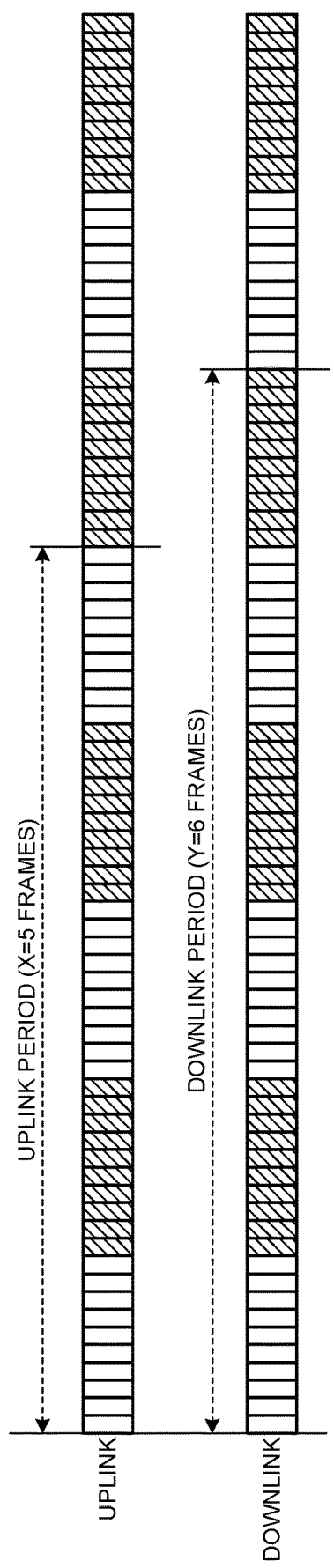
FIG. 6 is a diagram of an uplink period and a downlink period.

FIG. 6 is a diagram of the uplink period and the downlink period. The uplink period is a communication period for managing timings to transmit data to the radio devices 20 on the upstream. The downlink period is a communication period for managing timings to transmit data to the radio devices 20 on the downstream.

The uplink period includes X frames. The downlink period includes Y frames.

Both X and Y are integers of 2 or larger. X and Y are different values. Either X or Y may be larger than the other. The larger number of X and Y is not an integral multiple of the smaller number. In other words, if X>Y is satisfied, X is not an integral multiple of Y; and if Y>X is satisfied, Y is not an integral multiple of X. At least one of X and Y is preferably an odd number.

The aggregation device 22 may determine X and Y by receiving an upper limit input by a user, where X and Y are equal to or smaller than the received upper limit. The aggregation device 22, for example, may determine X and Y such that they are as large as possible within a range not exceeding the upper limit. As X and Y become larger, the aggregation device 22 can make the uplink period and the downlink period longer. If the uplink period and the downlink period are made longer, the number of times of data transmission by the radio devices 20 per unit time is reduced as a result of allocation of the radio devices 20 to the frames (which will be described later in greater detail). By making X and Y as large as possible within a range not exceeding the upper limit, the radio communication system 10 can reduce the number of times of data transmission by the radio devices 20, thereby reducing power consumption. In addition, the radio communication system 10 can reduce a delay time in data transfer by multi-hop to an upper limit or shorter.

FIG. 6 illustrates an example of the uplink period and the downlink period where the frame includes ten slots, and X=5 and Y=6 are satisfied. In the example illustrated in FIG. 6, the uplink period includes 50 slots, and the downlink period includes 60 slots. If the slot is 100 milliseconds, for example, the uplink period is five seconds, and the downlink period is six seconds.

Figure 7:
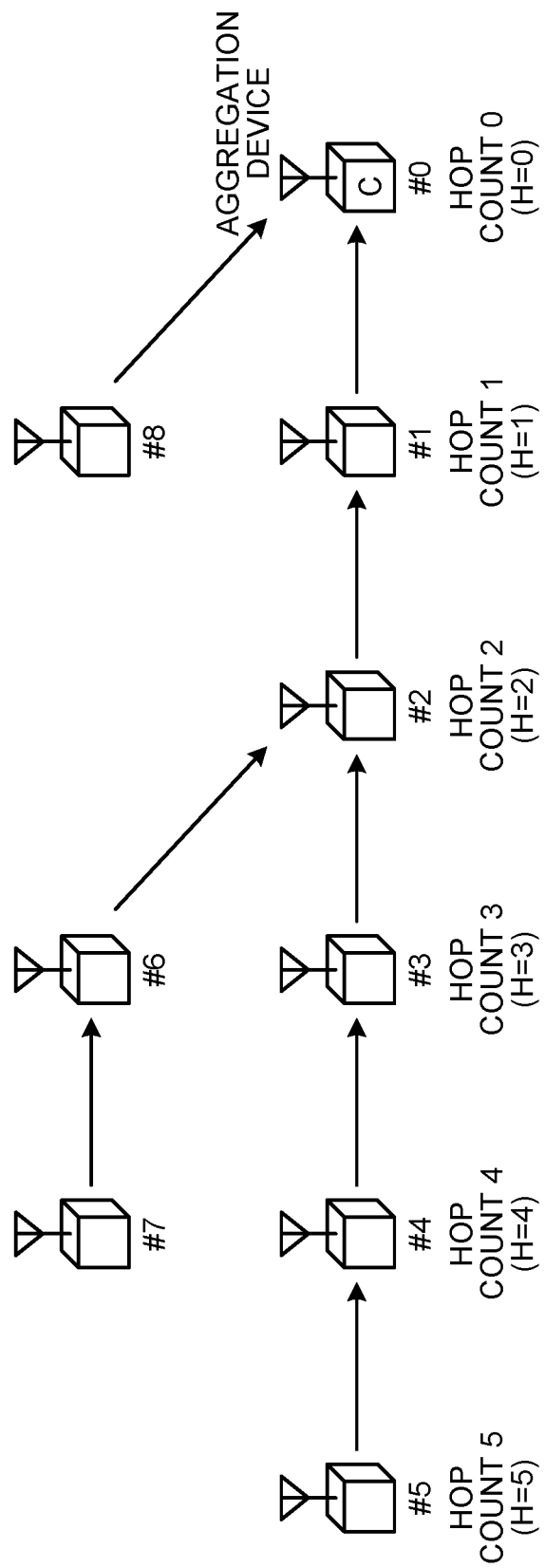
FIG. 7 is a diagram of hop counts of respective radio devices.

FIG. 7 is a diagram of hop counts the respective radio devices 20. The radio devices 20 are each allocated to the corresponding one of the frames included in the uplink period and the corresponding one of the frames included in the downlink period according to a predetermined rule (e.g., a predetermined algorithm).

The predetermined rule is that hop counts of the radio devices 20 are allocated to the frames. The hop count indicates the number of radio devices 20 that transmit data on the shortest path for transmitting the data from the target radio device 20 to the radio device 20 (aggregation device 22) disposed at the root position. In other words, the hop count is the smallest number of times of data transmission required to transmit data generated by the radio device 20 to the radio device 20 (aggregation device 22) disposed at the root position. The hop count of the radio device 20 (aggregation device 22) disposed at the root position is 0. The hop count is an integer of 0 or larger and is represented by H.

In the tree structure illustrated in FIG. 7, for example, the hop count of the radio device 20 of #0 is 0. The hop count of the radio devices 20 of #1 and #8 is 1. The hop count of the radio device 20 of #2 is 2. The hop count of the radio devices 20 of #3 and #6 is 3. The hop count of the radio devices 20 of #4 and #7 is 4. The hop count of the radio device 20 of #5 is 5.

The radio devices 20 each allocate the hop count of the radio device 20 to at least one frame in the uplink period according to the predetermined rule. An example of allocation to the uplink period will be described later with reference to FIG. 8.

The radio devices 20 each allocate the hop count of the radio device 20 to at least one frame in the downlink period according to the predetermined rule. An example of allocation to the downlink period will be described later with reference to FIG. 10.

The radio devices 20 allocate the hop counts to the frames according to a common rule (e.g., a common algorithm). With this configuration, the radio devices 20 can allocate the same hop count to the same frame if they independently perform allocation. As a result, the radio devices 20 need not transmit data indicating the allocated hop counts to each other, thereby reducing the traffic.

The radio devices 20 may each allocate the hop count to the frame included in the uplink period first and then allocate the hop count to the frame included in the downlink period. The order of allocation may be opposite.

Each of the radio devices 20 transmits uplink data in the multi-hop network in the frame to which the hop count of the own device included in the uplink period is allocated. An example of the timings of transmitting the uplink data will be described in greater detail with reference to FIG. 9.

Each of the radio devices 20 transmits downlink data in the multi-hop network in the frame to which the hop count of the own device included in the downlink period is allocated. An example of the timings of transmitting the downlink data will be described in greater detail with reference to FIG. 11.

Figure 8:
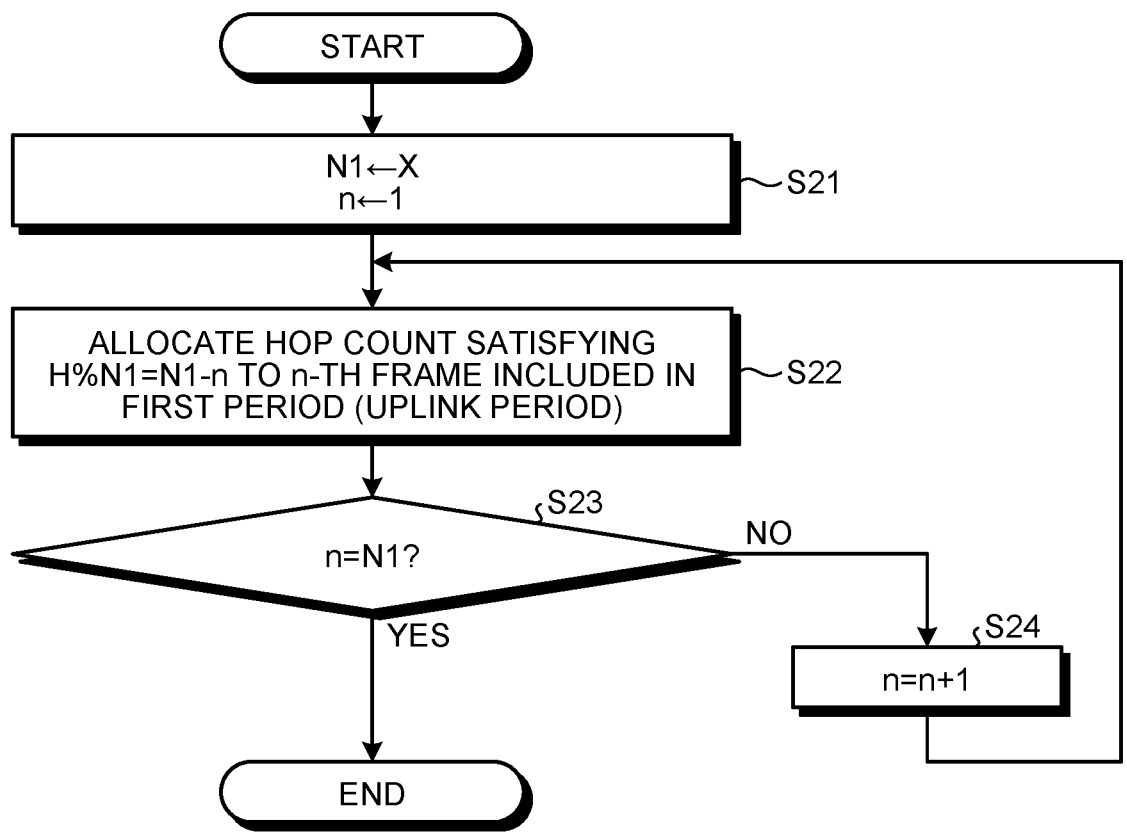
FIG. 8 is a flowchart of allocating the hop count in the uplink period.

FIG. 8 is a flowchart of an example of allocating the hop count in the uplink period. The radio devices 20, for example, allocate the hop counts to the respective frames included in the uplink period based on the flowchart illustrated in FIG. 8.

The radio device 20 substitutes X representing the number of frames included in the uplink period for N1 at S21. N1 represents the first period. The radio device 20 substitutes 1 for n. n is an integer and represents the position of the frame in the first period.

Subsequently, the radio device 20 allocates the hop count satisfying H % N1=N1−n to the n-th frame included in the first period at S22. H % N1 represents the remainder of H divided by N1. In other words, the radio device 20 allocates the hop count, for which the remainder resulted by dividing by N1 is N1−n, to the n-th frame included in the first period.

Subsequently, the radio device 20 determines whether n=N1 is satisfied at S23. If n=N1 is satisfied (Yes at S23), the radio device 20 ends the present procedure. If n=N1 is not satisfied (No at S23), the radio device 20 performs the processing at S24. The radio device 20 adds 1 to n at S24. After S24, the radio device 20 performs the processing at S22 again.

The radio devices 20 determine the radio devices 20 that can transmit uplink data in the respective frames included in the uplink period based on the hop counts allocated by the flowchart illustrated in FIG. 8. The radio devices 20 each transmit the uplink data in the frame to which the hop count of own device is allocated in the uplink period.

Figure 9:
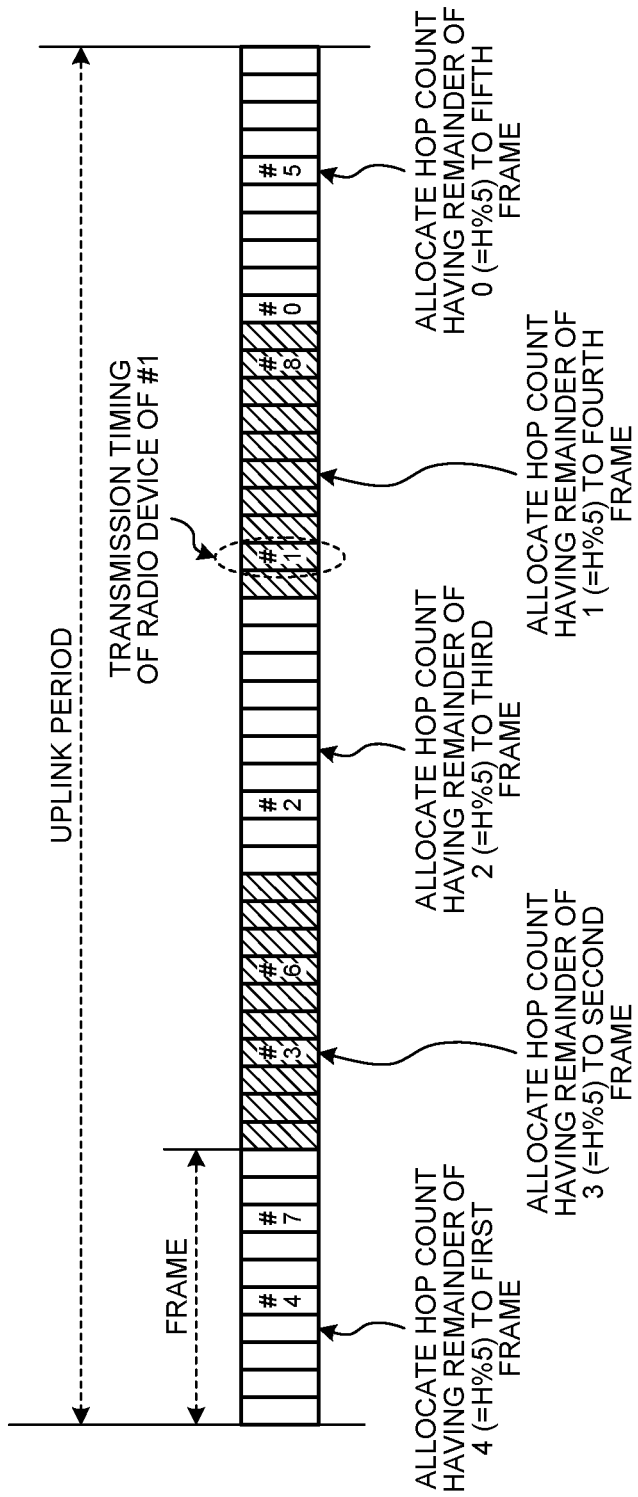
FIG. 9 is a diagram of timings of transmitting uplink data.

FIG. 9 is a diagram of timings of transmitting the uplink data. If N1=X=5 is satisfied, the radio devices 20 can allocate the hop counts illustrated in FIG. 9 to the five frames included in each uplink period by performing the processing illustrated in FIG. 8.

Specifically, the radio devices 20 having the hop count with a remainder of 4 are allocated to the first frame of the uplink period. In other words, the radio devices 20 having the hop counts of 4, 9, 14, 19, . . . are allocated to the first frame of the uplink period. Consequently, the radio devices 20 of #4 and #7 (having the hop count of 4) in the network illustrated in FIG. 7 transmit the uplink data in the first frame included in the uplink period.

The radio devices 20 having the hop count with a remainder of 3 are allocated to the second frame of the uplink period. In other words, the radio devices 20 having the hop counts of 3, 8, 13, 18, . . . are allocated to the second frame of the uplink period. Consequently, the radio devices 20 of #3 and #6 (having the hop count of 3) in the network illustrated in FIG. 7 transmit the uplink data in the second frame included in the uplink period.

The radio devices 20 having the hop count with a remainder of 2 are allocated to the third frame of the uplink period. In other words, the radio devices 20 having the hop counts of 2, 7, 12, 17, . . . are allocated to the third frame of the uplink period. Consequently, the radio device 20 of #2 (having the hop count of 2) in the network illustrated in FIG. 7 transmits the uplink data in the third frame included in the uplink period.

The radio devices 20 having the hop count with a remainder of 1 are allocated to the fourth frame of the uplink period. In other words, the radio devices 20 having the hop counts of 1, 6, 11, 16, . . . are allocated to the fourth frame of the uplink period. Consequently, the radio devices 20 of #1 and #8 (having the hop count of 1) in the network illustrated in FIG. 7 transmit the uplink data in the fourth frame included in the uplink period.

The radio devices 20 having the hop count with a remainder of 0 are allocated to the fifth frame of the uplink period. In other words, the radio devices 20 having the hop counts of 0, 5, 10, 15, . . . are allocated to the fifth frame of the uplink period.

By performing the processing described above on the uplink period, the radio devices 20 can each allocate its hop count to at least one frame included in the uplink period. Consequently, all the radio devices 20 connected to the network can transmit the uplink data at least once in each uplink period.

By performing the processing described above on the uplink period, the radio devices 20 allocate the hop counts such that the remainder obtained by performing division by the number of frames (N1=X) included in the uplink period decreases by 1 from the first frame to the last frame of the uplink period. Specifically, the radio devices 20 allocate the remainders in order of 4, 3, 2, 1, and 0 (sequentially) from the first frame to the last frame of the uplink period.

To transmit data in the up direction from the radio device 20 having the hop count of 4 (the remainder of which is 4) to the radio device 20 having the hop count of 0 (the remainder of which is 0), for example, the radio communication system 10 can transmit data four times in one uplink period. Consequently, the radio communication system 10 can transmit data generated by the radio device 20 on the downstream to the radio device 20 on the upstream in a short time.

The radio devices 20 may perform allocation according to other rules (other algorithms) as long as the radio devices 20 connected to the network can be each allocated to at least one frame included in the uplink period. In this case, the radio devices 20 preferably perform efficient allocation so as to transfer the uplink data by the bucket-brigade system in a short time.

The radio devices 20 may perform the processing of the flowchart illustrated in FIG. 8 not on the uplink period but on the downlink period. In this case, the radio device 20 substitutes Y representing the number of frames included in the downlink period for N1 representing the first period at S21. Subsequently, the radio device 20 allocates the hop count satisfying H % N1=n−1 to the n-th frame included in the first period at S22. In other words, the radio device 20 allocates the hop count, for which the remainder resulted by dividing by N1 is n−1 to the n-th frame included in the first period. As a result, the radio devices 20 can allocate the hop counts such that the remainder resulted by performing division by the number of frames (N1=X) included in the downlink period is incremented by 1 from the first frame to the last frame of the downlink period. Specifically, the radio devices 20 can allocate the remainder in order of 0, 1, 2, 3, and 4 from the first frame to the last frame of the downlink period. With this configuration, the radio communication system 10 can transmit data four times in one downlink period. Consequently, the radio communication system 10 can transmit data generated by the radio device 20 on the upstream to the radio device 20 on the downstream in a short time.

Figure 10:
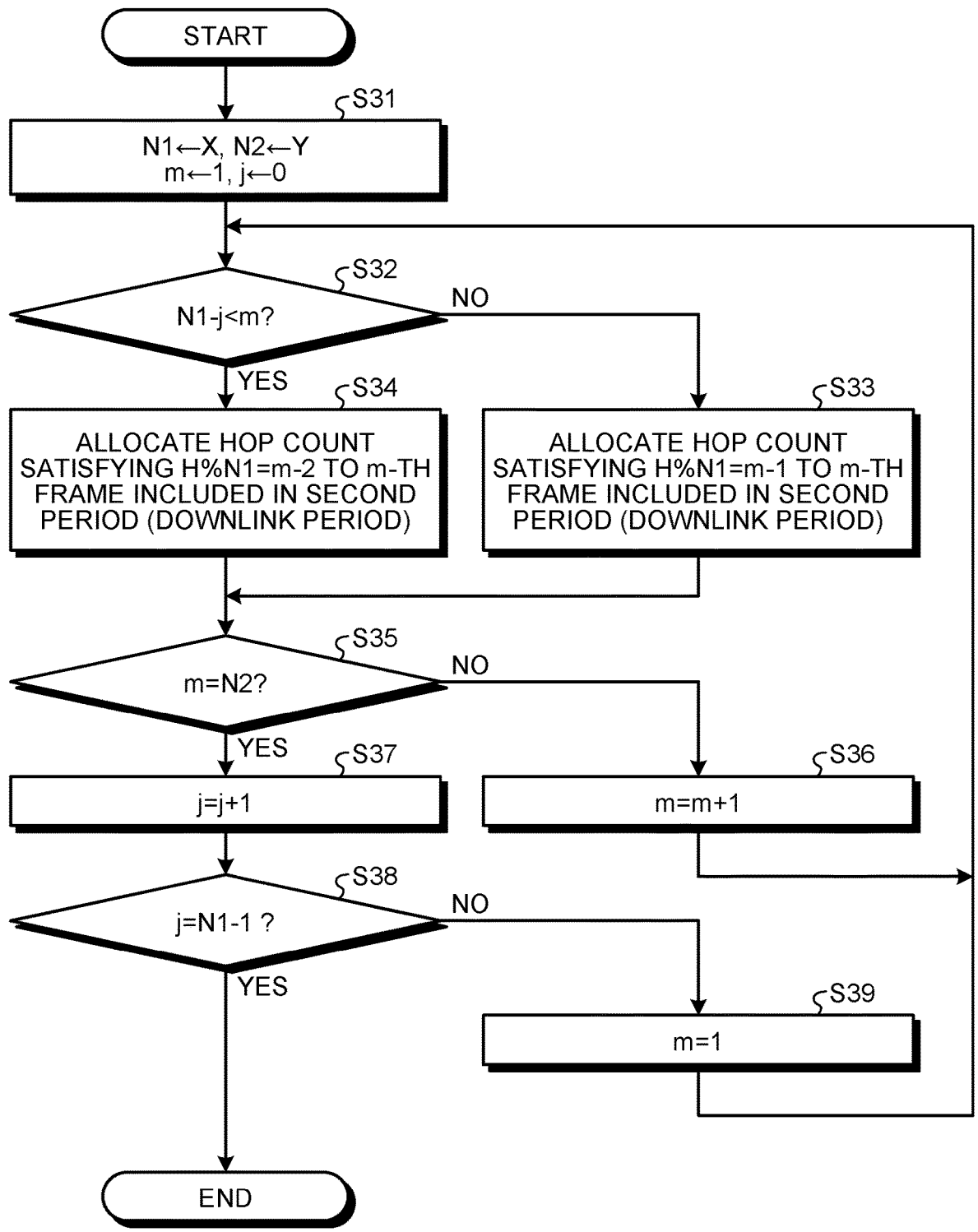
FIG. 10 is a flowchart of allocating the hop count in the downlink period according to the first embodiment.

FIG. 10 is a flowchart of an example of allocating the hop count in the downlink period according to the first embodiment.

If the hop counts are allocated to the uplink period by the processing illustrated in FIG. 8, and Y is larger than X by 1, the radio devices 20 allocate the hop counts to the respective frames included in the downlink period based on the flowchart illustrated in FIG. 10.

The radio device 20 substitutes X representing the number of frames included in the uplink period for N1 at S31. N1 represents the first period. The radio device 20 substitutes Y representing the number of frames included in the downlink period for N2. N2 represents the second period.

The radio device 20 substitutes 1 for m. m is an integer and represents the position of the frame in the second period. The radio device 20 substitutes 0 for j. j is an integer that is incremented by 1 from 0 to N1 and represents the position of the second period in N1 second periods. In the first second period in the N1 second periods, j=0 is satisfied.

Subsequently, the radio device 20 determines whether N1−j<m is satisfied at S32. If N1−j<m is not satisfied (No at S32), the radio device 20 performs the processing at S33. If N1−j<m is satisfied (Yes at S32), the radio device 20 performs the processing at S34.

The radio device 20 allocates the hop count satisfying H % N1=m−1 to the m-th frame included in the second period at S33. In other words, the radio device 20 allocates the hop count, for which the remainder resulted by dividing by N1 is m−1, to the m-th frame included in the second period.

The radio device 20 allocates the hop count satisfying H % N1=m−2 to the m-th frame included in the second period at S34. In other words, the radio device 20 allocates the hop count, for which the remainder resulted by dividing by N1 is m−2, to the m-th frame included in the second period. By performing the processing at S34, for the radio device 20, the hop count allocated to the (N1−j)-th frame is made to be the same as the hop count allocated to the (N1−j+1)-th frame in the second period.

The radio device 20 determines whether m=N2 is satisfied at S35. If m=N2 is satisfied (Yes at S35), the radio device 20 performs the processing at S37. If m=N2 is not satisfied (No at S35), the radio device 20 performs the processing at S36. The radio device 20 adds 1 to m at S36. After S36, the radio device 20 performs the processing at S32 again.

The radio device 20 adds 1 to j at S37. Subsequently, the radio device 20 determines whether j=N1−1 is satisfied at S38. If j=N1−1 is satisfied (Yes at S38), the radio device 20 ends the present procedure. In other words, if the radio device 20 allocates the hop count to the N1 second periods, the radio device 20 ends the processing.

If j=N1−1 is not satisfied (No at S38), the radio device 20 performs the processing at S39. The radio device 20 substitutes 1 for m at S39. After S39, the radio device 20 performs the processing at S32 again.

The radio devices 20 determine the radio devices 20 that can transmit downlink data in the respective frames included in the N1 downlink periods based on the hop counts allocated by the flowchart illustrated in FIG. 10. The radio devices 20 repeatedly perform allocation and determination of the radio devices 20 that can transmit the downlink data for each of the N1 downlink periods. The pattern of allocating the radio devices 20 that can transmit the downlink data is the same for each of N downlink periods. Consequently, the radio devices 20 determine the radio devices 20 that can transmit the downlink data in the N downlink periods with the same pattern for each of the N downlink periods. The radio devices 20 each transmit the downlink data in the frame to which the hop count of own device is allocated in the downlink period.

Figure 11:
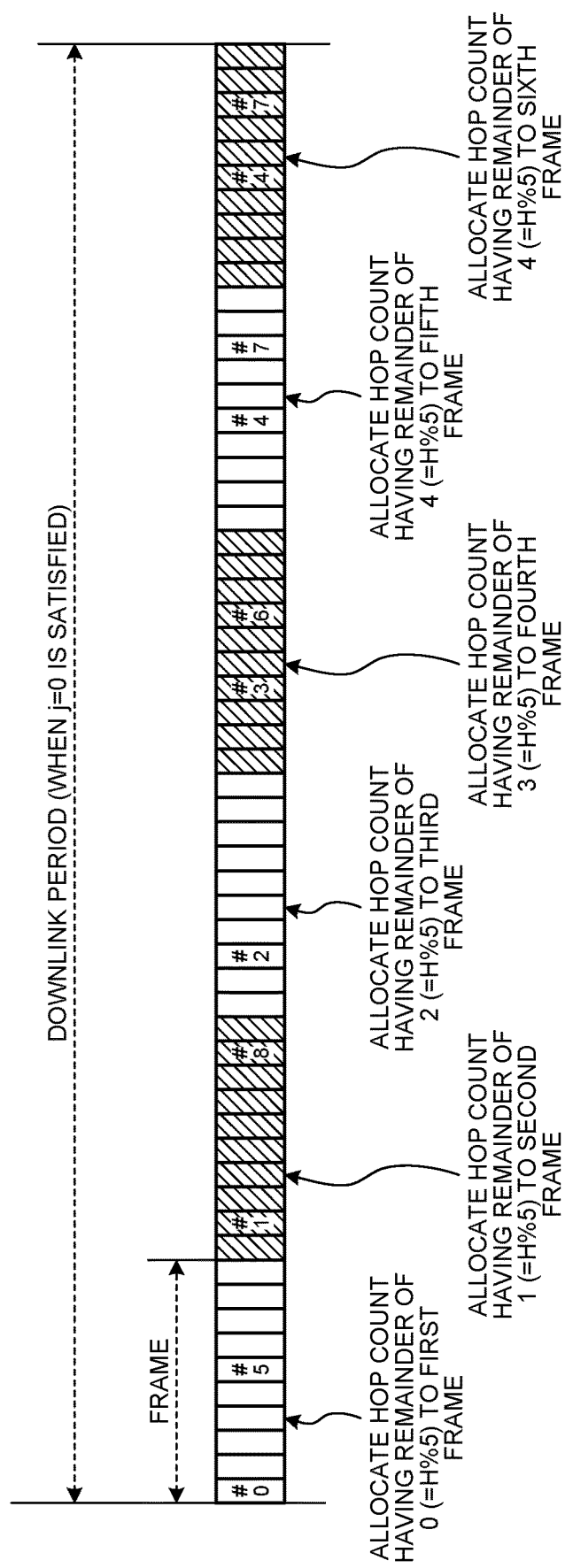
FIG. 11 is a diagram of timings of transmitting downlink data according to the first embodiment.

FIG. 11 is a diagram of timings of transmitting the downlink data according to the first embodiment. If N1=X=5 and N2=Y=6 are satisfied, the radio devices 20 can allocate the hop counts illustrated in FIG. 11 to the six frames included in the downlink period satisfying j=0 by performing the processing illustrated in FIG. 10.

Specifically, the radio devices 20 having the hop count with a remainder of 0 are allocated to the first frame of the downlink period satisfying j=0. In other words, the radio devices 20 having the hop counts of 0, 5, 10, 15, . . . are allocated to the first frame of the downlink period satisfying j=0. Consequently, the radio devices 20 of #0 and #5 (having the hop count of 0) in the network illustrated in FIG. 7 transmit the downlink data in the first frame in the downlink period satisfying j=0.

The radio devices 20 having the hop count with a remainder of 1 are allocated to the second frame of the downlink period satisfying j=0. In other words, the radio devices 20 having the hop counts of 1, 6, 11, 16, . . . are allocated to the second frame of the downlink period satisfying j=0. Consequently, the radio devices 20 of #1 and #8 (having the hop count of 1) in the network illustrated in FIG. 7 transmit the downlink data in the second frame in the downlink period satisfying j=0.

The radio devices 20 having the hop count with a remainder of 2 are allocated to the third frame of the downlink period satisfying j=0. In other words, the radio devices 20 having the hop counts of 2, 7, 12, 17, . . . are allocated to the third frame of the downlink period satisfying j=0. Consequently, the radio device 20 of #2 (having the hop count of 2) in the network illustrated in FIG. 7 transmits the downlink data in the third frame in the downlink period satisfying j=0.

The radio devices 20 having the hop count with a remainder of 3 are allocated to the fourth frame of the downlink period satisfying j=0. In other words, the radio devices 20 having the hop counts of 3, 8, 13, 18, . . . are allocated to the fourth frame of the downlink period satisfying j=0. Consequently, the radio devices 20 of #3 and #6 (having the hop count of 3) in the network illustrated in FIG. 7 transmit the downlink data in the fourth frame in the downlink period satisfying j=0.

The radio devices 20 having the hop count with a remainder of 4 are allocated to both the fifth and the sixth frames of the downlink period satisfying j=0. In other words, the radio devices 20 having the hop counts of 4, 9, 14, 19, . . . are allocated to both the fifth and the sixth frames of the downlink period satisfying j=0. Consequently, the radio devices 20 of #4 and #7 (having the hop count of 4) in the network illustrated in FIG. 7 transmit the downlink data in the fifth and the sixth frames in the downlink period satisfying j=0.

In the downlink periods satisfying j=0 to (N1−1), the radio devices 20 having the hop count with a remainder of (m−1) are allocated to the first to the (N1−j)-th frames, and the radio devices 20 having the hop count with a remainder of (m−2) are allocated to the (N1−j+1)-th to the N2-th frames. As a result, the radio devices 20 having the hop count with a remainder of (N1−j−1) are allocated to both the (N1−j)-th and the (N1−j+1)-th frames in the downlink periods satisfying j=0 to (N1−1).

By performing the processing described above on the downlink period, the radio devices 20 can each allocate its hop count to at least one frame included in the downlink period. Consequently, all the radio devices 20 connected to the network can transmit the downlink data at least once in each downlink period.

By performing the processing described above on the downlink period, the radio devices 20 allocate the hop counts such that the remainder obtained by performing division by the number of frames (N1=X) included in the downlink period is incremented by 1 or remains the same from the first frame to the last frame of the downlink period.

Specifically, the radio devices 20 allocate the remainders in order of 0, 1, 2, 3, 4, and 4 from the first frame to the last frame in the downlink period satisfying j=0. The radio devices 20 allocate the remainders in order of 0, 1, 2, 3, 3, and 4 from the first frame to the last frame in the downlink period satisfying j=1. The radio devices 20 allocate the remainders in order of 0, 1, 2, 2, 3, and 4 from the first frame to the last frame in the downlink period satisfying j=2. The radio devices 20 allocate the remainders in order of 0, 1, 1, 2, 3, and 4 from the first frame to the last frame in the downlink period satisfying j=3. The radio devices 20 allocate the remainders in order of 0, 0, 1, 2, 3, and 4 from the first frame to the last frame in the downlink period satisfying j=4.

To transmit data in the down direction from the radio device 20 having the hop count of 0 (the remainder of which is 0) to the radio device 20 having the hop count of 4 (the remainder of which is 4), for example, the radio communication system 10 can transmit data four times in one downlink period. Consequently, the radio communication system 10 can transmit data generated by the radio device 20 on the upstream to the radio device 20 on the downstream in a short time.

The radio devices 20 may perform allocation according to other rules (other algorithms) as long as the radio devices 20 connected to the network can be each allocated to at least one frame included in the downlink period. In this case, the radio devices 20 preferably perform allocation so as to transfer the downlink data by the bucket-brigade system in a short time.

The radio devices 20 allocate, to the m-th frame included in the second period, the hop count, for which the remainder resulted by dividing by N1 is equal to or larger by 1 than the remainder allocated to the (m−1)-th frame and allocate the hop count, for which the remainder resulted by dividing by N1 is 0 to (N1−1), to any one of N2 frames included in the second period, for example. In this case, the radio devices 20 allocate the hop count, for which the remainder resulted by dividing by N1 is 0, to the first frame included in the second period. With this configuration, the radio devices 20 can allocate the same hop count to any two or more frames in the second periods satisfying j=0 to (N1−1).

While the flowchart illustrated in FIG. 10 indicates the processing performed when Y is larger than X by 1, Y may be larger than X by 2 or more. In this case, the radio devices 20 allocate the same hop count as that of the (N1−j)-th frame consecutively from the (N1−j)-th frame to the frames the number of which corresponds to the difference between Y and X. In other words, the radio devices 20 allocate the same hop count as that of the (N1−j)-th frame from the (N1−j)-th frame to the (N1−j+(N2−N1))-th frame. The radio devices 20 allocate the hop count, for which the remainder resulted by dividing by N1 is m−(N2−N1), to the frames subsequent to the (N1−j+(N2−N1))-th frame.

If X is larger than Y by 1, the radio devices 20 may perform the processing of the flowchart illustrated in FIG. 9 not on the downlink period but on the uplink period. In this case, the radio device 20 substitutes Y representing the number of frames included in the downlink period for N1 representing the first period and substitutes X representing the number of frames included in the uplink period for N2 representing the second period at S31.

In this case, the radio device 20 allocates the hop count satisfying H % N1=N1−m to the m-th frame included in the second period at S33. In other words, if N1−j<m is not satisfied, the radio device 20 allocates the hop count, for which the remainder resulted by dividing by N1 is N1−m, to the m-th frame included in the second period.

In this case, the radio device 20 allocates the hop count satisfying H % N1=N1−(m−1) to the m-th frame included in the second period at S34. In other words, if N1−j<m is satisfied, the radio device 20 allocates the hop count, for which the remainder resulted by dividing by N1 is N1−(m−1), to the m-th frame included in the second period. As a result, the radio devices 20 can allocate the hop counts such that the remainder obtained by performing division by the number of frames (N1=Y) included in the downlink period decreases by 1 or remains the same from the first frame to the last frame of the uplink period.

If X=6 and Y=5 are satisfied, for example, the radio devices 20 allocate the remainders in order of 4, 3, 2, 1, 0, and 0 from the first frame to the last frame in the uplink period satisfying j=0. The radio devices 20 allocate the remainders in order of 4, 3, 2, 1, 1, and 0 from the first frame to the last frame in the uplink period satisfying j=1. The radio devices 20 allocate the remainders in order of 4, 3, 2, 2, 1, and 0 from the first frame to the last frame in the uplink period satisfying j=2. The radio devices 20 allocate the remainders in order of 4, 3, 3, 2, 1, and 0 from the first frame to the last frame in the uplink period satisfying j=3. The radio devices 20 allocate the remainders in order of 4, 4, 3, 2, 1, and 0 from the first frame to the last frame in the uplink period satisfying j=4.

Figure 12:
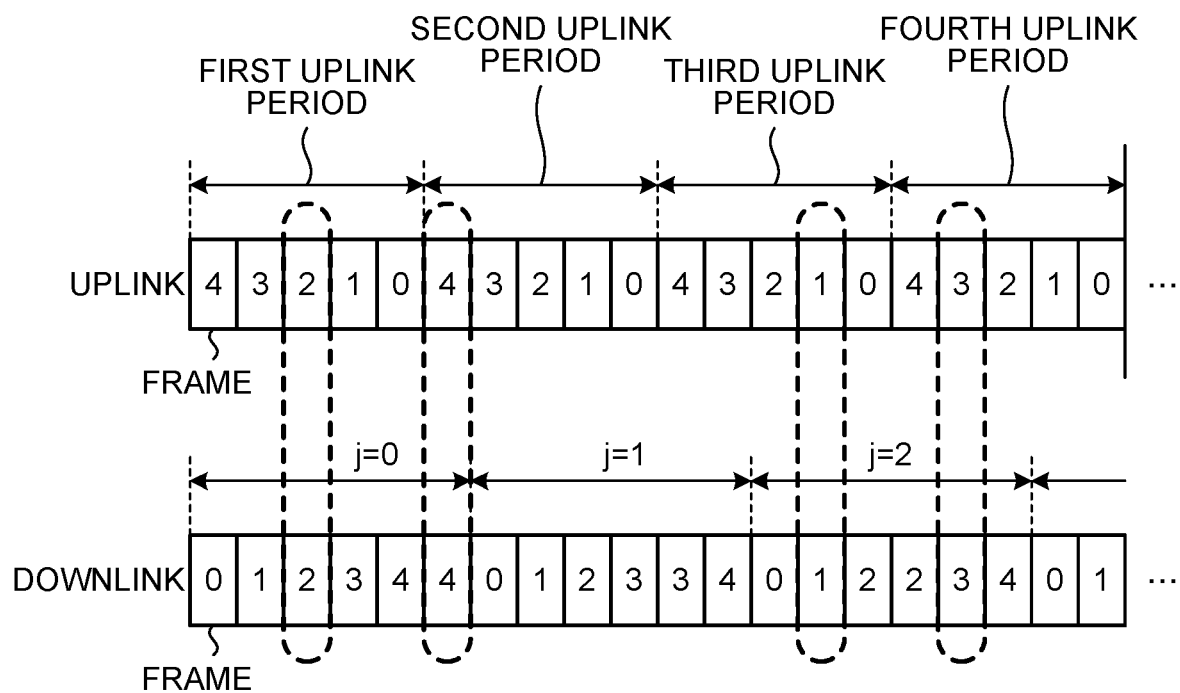
FIG. 12 is a diagram of simultaneous transmission frames according to the first embodiment.

FIG. 12 is a diagram of an example of the hop counts allocated to the respective frames of the uplink and the downlink according to the first embodiment.

By performing the processing of the flowchart illustrated in FIGS. 8 and 10, for the radio devices 20, the hop count allocated to an arbitrary frame of the X frames included in the uplink period is made to be the same as the hop count allocated to the frame whose timing is the same as that of the arbitrary frame in the downlink period. The radio devices 20 vary the position of the arbitrary frame having the same hop count as that allocated to the frame in the downlink period and the hop count allocated thereto depending on the uplink period.

Among the X frames included in the uplink period, the frame, for which the hop count is the same as that of the frame included in the downlink period whose timing is the same, is referred to as a simultaneous transmission frame.

If X=5 and Y=6 are satisfied, for example, the simultaneous transmission frame in the first uplink period is the third frame, and the hop count having a remainder of 2 is allocated thereto as illustrated in FIG. 12. In the second uplink period subsequent to the first uplink period, the simultaneous transmission frame is the first frame, and the hop count having a remainder of 4 is allocated thereto. In the third uplink period subsequent to the second uplink period, the simultaneous transmission frame is the fourth frame, and the hop count having a remainder of 1 is allocated thereto. In the fourth uplink period subsequent to the third uplink period, the simultaneous transmission frame is the second frame, and the hop count having a remainder of 3 is allocated thereto. As described above, the hop count allocated to the simultaneous transmission frame varies depending on the uplink period.

The radio device 20 that transmits data in the simultaneous transmission frame can transmit the uplink data and the downlink data at the same timing. Consequently, the radio device 20 that transmits data in the simultaneous transmission frame can reduce power consumption.

The radio communication system 10 varies the radio device 20 that can transmit data in the simultaneous transmission frame depending on the uplink period. Consequently, the radio communication system 10 can reduce power consumption of the radio devices 20.

The radio devices 20 does not necessarily perform allocation according to the algorithm that generates the pattern illustrated in FIG. 12. The radio devices 20 may allocate the hop counts to the respective frames according to any kind of algorithm as long as the simultaneous transmission frames are allocated to the respective radio devices 20 included in the radio communication system 10 at any timing.

The radio devices 20, for example, may allocate the hop counts to the respective X frames included in the uplink period and to the respective Y frames included in the downlink period by the following algorithm. Specifically, for the radio devices 20, the hop count allocated to the first frame of the X frames included in the first uplink period serving as an arbitrary uplink period is made to be the same as the hop count allocated to the frame whose timing is the same as that of the first frame in the downlink period. For the radio devices 20, the hop count allocated to the second frame of the X frames included in the second uplink period serving as an arbitrary uplink period differing from the first uplink period is made to be the same as the hop count allocated to the frame whose timing is the same as that of the second frame in the downlink period. The radio devices 20 have differing values for the hop count allocated to the first frame and the hop count allocated to the second frame.

With this configuration, the radio communication system 10 can change the radio device 20 that can transmit data in the simultaneous transmission frame depending on the uplink period. Consequently, the radio communication system 10 can reduce power consumption of the radio devices 20.

Second Embodiment

The following describes the radio communication system 10 according to a second embodiment. The radio communication system 10 according to the second embodiment has substantially the same configuration as that of the first embodiment.

The radio communication system 10 according to the second embodiment is different from the first embodiment in allocating the hop counts to the downlink period and is the same as the first embodiment in the other processing. The following describes the difference from the first embodiment of the radio communication system 10 according to the second embodiment.

Figure 13:
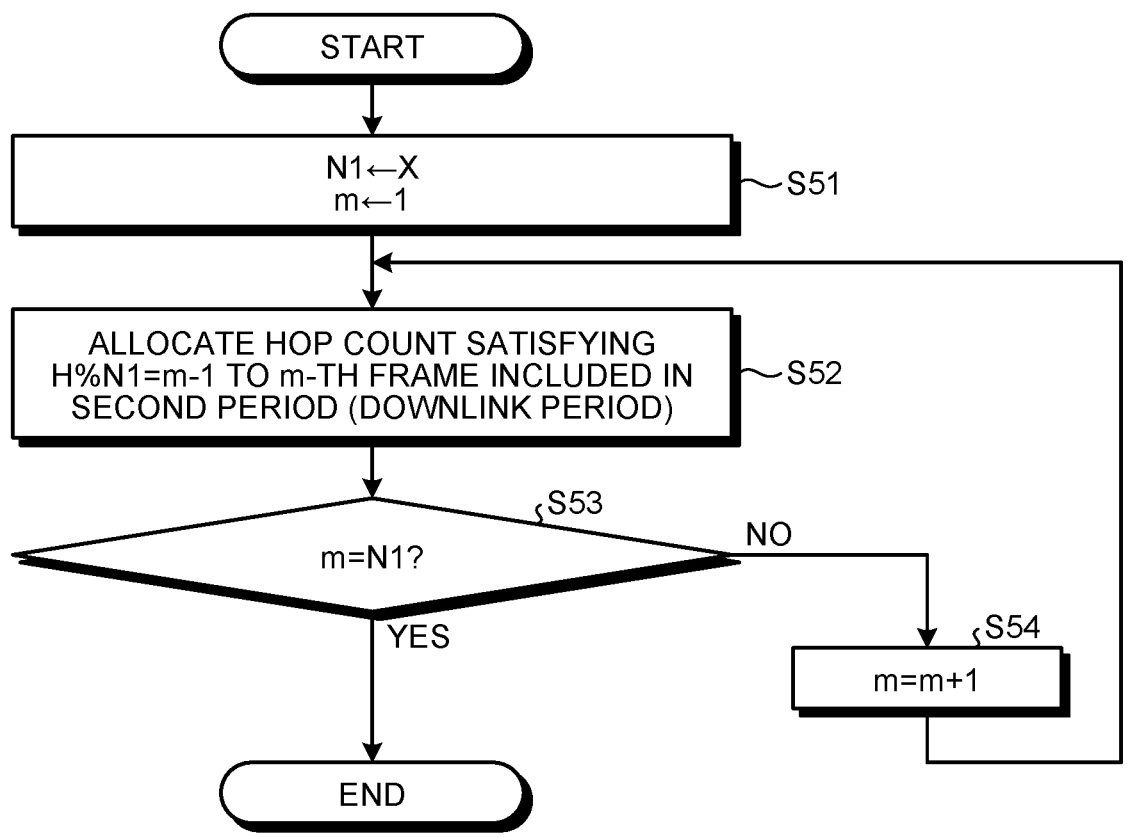
FIG. 13 is a flowchart of allocating the hop count in the downlink period according to a second embodiment.

FIG. 13 is a flowchart of an example of allocating the hop count in the downlink period according to the second embodiment.

If the hop counts are allocated to the uplink period by the processing illustrated in FIG. 8, the radio devices 20 according to the second embodiment allocate the hop counts to the respective frames included in the downlink period based on the flowchart illustrated in FIG. 13.

The radio device 20 substitutes X representing the number of frames included in the uplink period for N1 at S51. The radio device 20 substitutes 1 for m.

The radio device 20 allocates the hop count satisfying H % N1=m−1 to the m-th frame included in the second period at S52. In other words, the radio device 20 allocates the hop count, for which the remainder resulted by dividing by N1 is m−1, to the m-th frame included in the second period.

The radio device 20 determines whether m=N1 is satisfied at S53. If m=N1 is satisfied (Yes at S53), the radio device 20 ends the present procedure. If m=N1 is not satisfied (No at S53), the radio device 20 performs the processing at S54. The radio device 20 adds 1 to m at S54. After S54, the radio device 20 performs the processing at S52 again.

Figure 14:
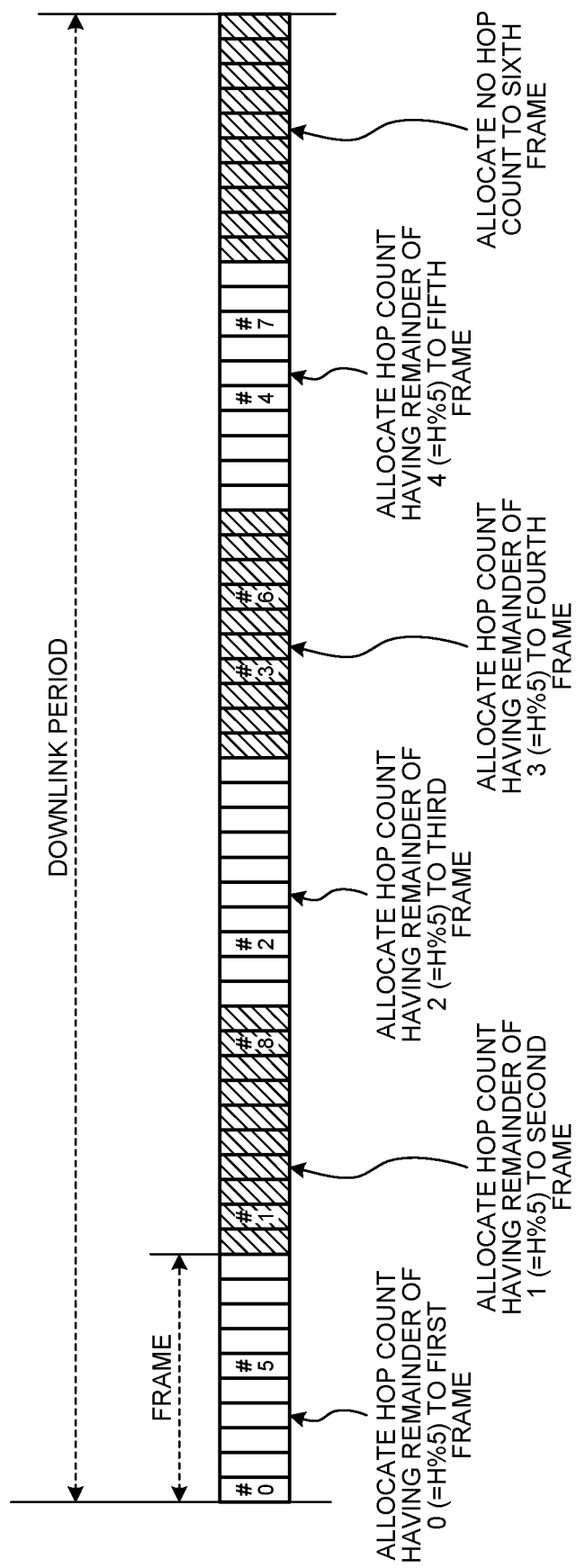
FIG. 14 is a diagram of the timings of transmitting downlink data according to the second embodiment.

FIG. 14 is a diagram of the timings of transmitting the downlink data according to the second embodiment. If N1=X=5 and Y=6 are satisfied, the radio devices 20 can allocate the hop counts illustrated in FIG. 14 to the six frames included in the downlink period by performing the processing illustrated in FIG. 13.

The radio devices 20 having the same hop counts as those of the first embodiment are allocated to the first to the fifth frames of the downlink period, for example. The second embodiment allocates no hop count to the sixth frame of the downlink period.

By performing the processing described above on the downlink period, the radio devices 20 can each allocate its hop count to at least one frame included in the downlink period. Consequently, all the radio devices 20 connected to the network can transmit the downlink data at least once in each downlink period.

By performing the processing described above on each downlink period, the radio devices 20 allocate the hop counts such that the remainder resulted by performing division by the number of frames (N1=X) included in the downlink period is incremented by 1 from the first frame to the last frame of the downlink period.

To transmit data in the down direction from the radio device 20 having the hop count of 0 (the remainder of which is 0) to the radio device 20 having the hop count of 4 (the remainder of which is 4), for example, the radio communication system 10 can transmit data four times in one downlink period. Consequently, the radio communication system 10 can transmit data generated by the radio device 20 on the upstream to the radio device 20 on the downstream in a short time.

If X is larger than Y, the radio devices 20 may perform the processing of the flowchart illustrated in FIG. 13 not on the downlink period but on the uplink period. In this case, the radio device 20 substitutes Y representing the number of frames included in the downlink period for N1 representing the first period at S51. The radio device 20 performs the processing at S51 to S54 by replacing m with n. The radio device 20 allocates the hop count satisfying H % N1=N1−n to the n-th frame included in the second period at S52. In other words, the radio device 20 allocates the hop count, for which the remainder resulted by dividing by N1 is N1−n, to the n-th frame included in the second period. As a result, the radio devices 20 can allocate the hop counts such that the remainder obtained by performing division by the number of frames (N1=Y) included in the downlink period decreases by 1 or remains the same from the first frame to the last frame of the uplink period.

Figure 15:
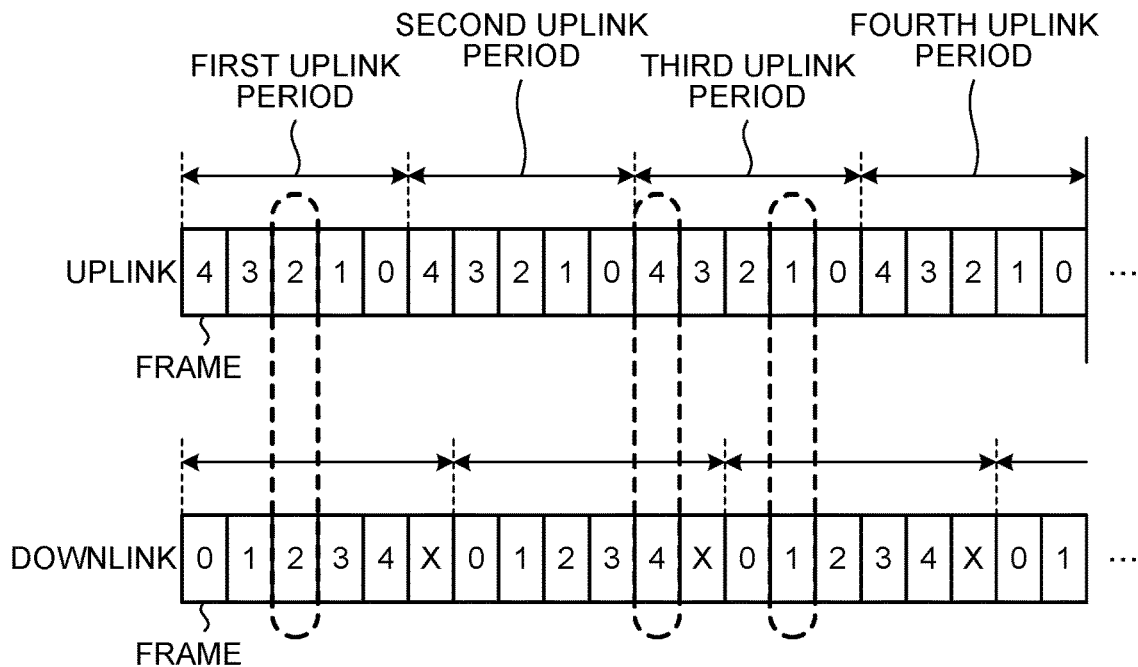
FIG. 15 is a diagram of the simultaneous transmission frames according to the second embodiment.

FIG. 15 is a diagram of an example of the hop counts allocated to the respective frames of the uplink and the downlink according to the second embodiment.

By performing the processing of the flowchart illustrated in FIGS. 8 and 13, the radio devices 20 make the hop count allocated to an arbitrary frame of the X frames included in the uplink period equal to the hop count allocated to the frame coming at the same timing as that of the arbitrary frame in the downlink period. The radio devices 20 vary the position of the arbitrary frame having the same hop count as that allocated to the frame in the downlink period and the hop count allocated thereto depending on the uplink period.

The radio communication system 10 according to the second embodiment varies the radio device 20 that can transmit data in the simultaneous transmission frame without fixing it. Consequently, the radio communication system 10 according to the second embodiment can reduce power consumption of the radio devices 20.

Third Embodiment

The following describes the radio communication system 10 according to a third embodiment. The radio communication system 10 according to the third embodiment has substantially the same configuration as that of the first and the second embodiments.

The radio communication system 10 according to the third embodiment is different from the first and the second embodiments in allocating the hop counts to the downlink period and is the same as the first and the second embodiments in the other processing. The following describes the difference from the first and the second embodiments of the radio communication system 10 according to the third embodiment.

Figure 16:
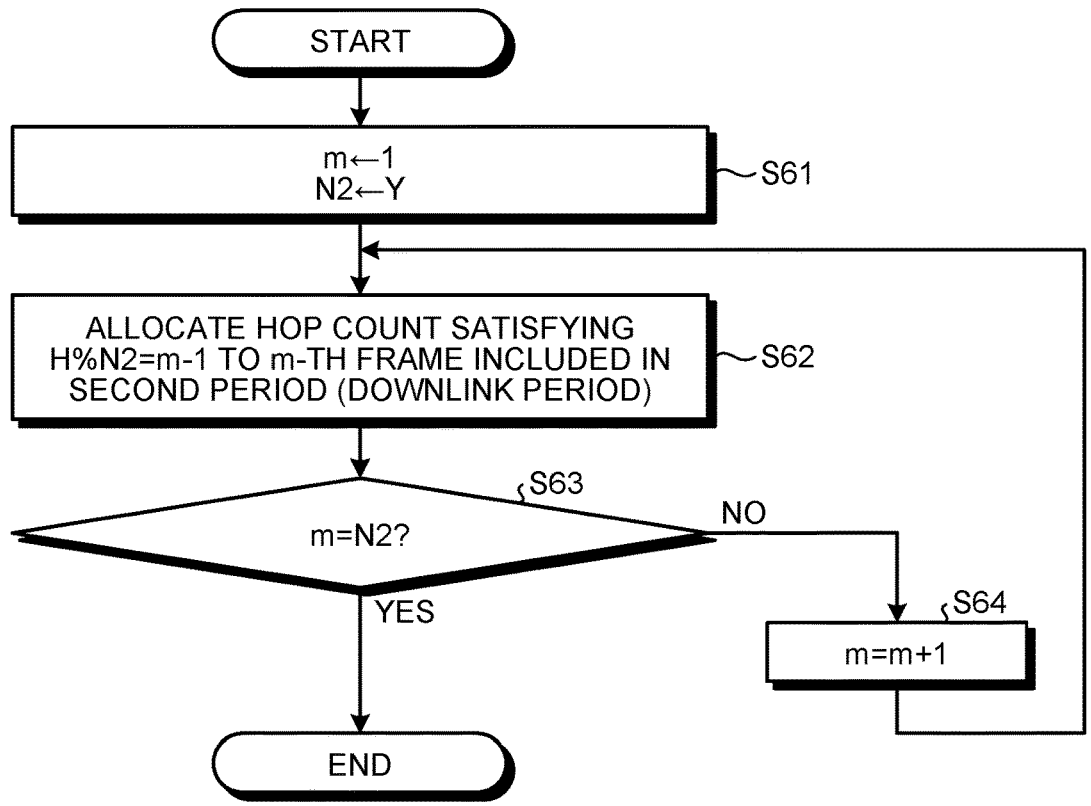
FIG. 16 is a flowchart of allocating the hop count in the downlink period according to a third embodiment.

FIG. 16 is a flowchart of an example of allocating the hop count in the downlink period according to the third embodiment.

If the hop counts are allocated to the uplink period by the processing illustrated in FIG. 8, the radio devices 20 according to the third embodiment allocate the hop counts to the respective frames included in the downlink period based on the flowchart illustrated in FIG. 16.

The radio device 20 substitutes Y representing the number of frames included in the downlink period for N2 at S61. N2 represents the second period. The radio device 20 substitutes 1 for m.

The radio device 20 allocates the hop count satisfying H % N2=m−1 to the m-th frame included in the second period at S62. In other words, the radio device 20 allocates the hop count, for which the remainder resulted by dividing by N2 is m−1, to the m-th frame included in the second period.

The radio device 20 determines whether m=N2 is satisfied at S63. If m=N2 is satisfied (Yes at S63), the radio device 20 ends the present procedure. If m=N2 is not satisfied (No at S63), the radio device 20 performs the processing at S64. The radio device 20 adds 1 to m at S64. After S64, the radio device 20 performs the processing at S62 again.

Figure 17:
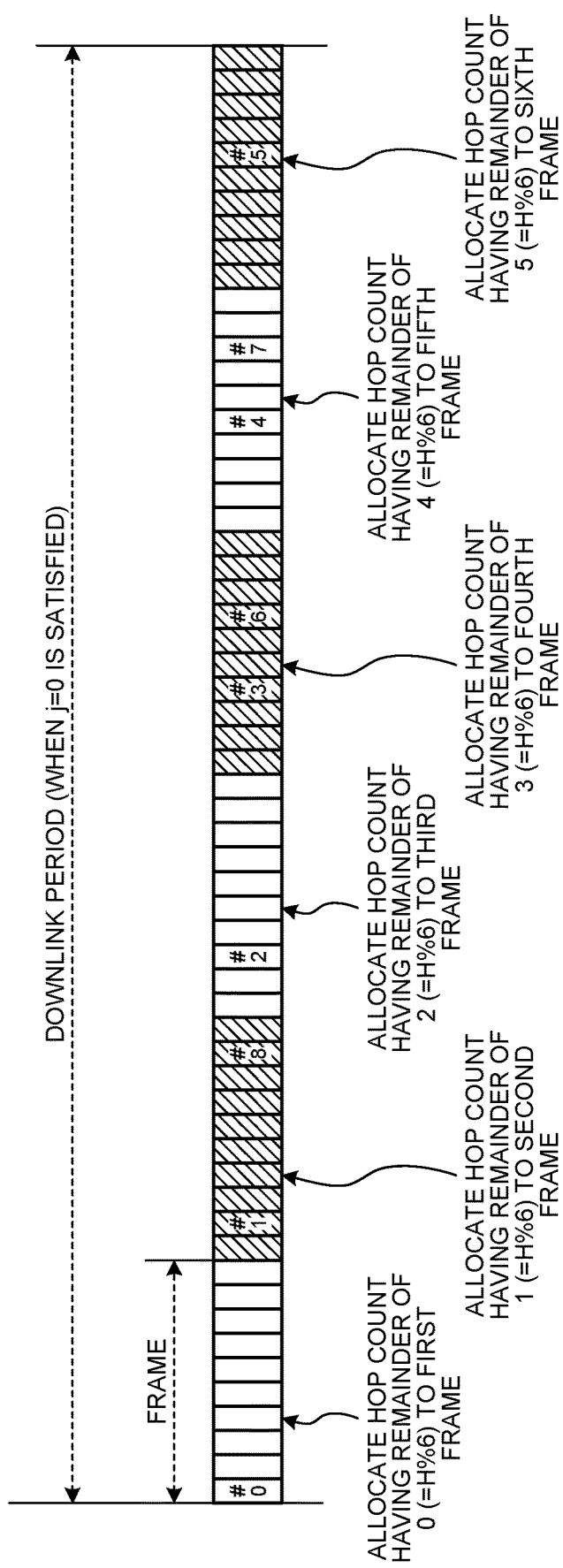
FIG. 17 is a diagram of the timings of transmitting downlink data according to the third embodiment.

FIG. 17 is a diagram of the timings of transmitting downlink data according to the third embodiment. If X=5 and N2=Y=6 are satisfied, the radio devices 20 can allocate the hop counts illustrated in FIG. 17 to the six frames included in the downlink period by performing the processing illustrated in FIG. 16.

Specifically, the radio devices 20 having the hop counts the remainder of which divided by 6 is 0 are allocated to the first frame of the downlink period. In other words, the radio devices 20 having the hop counts of 0, 6, 12, 18, . . . are allocated to the first frame of the downlink period.

The radio devices 20 having the hop counts the remainder of which divided by 6 is 1 are allocated to the second frame of the downlink period. In other words, the radio devices 20 having the hop counts of 1, 7, 13, 19, . . . are allocated to the second frame of the downlink period.

The radio devices 20 having the hop counts the remainder of which divided by 6 is 2 are allocated to the third frame of the downlink period. In other words, the radio devices 20 having the hop counts of 2, 8, 14, 20, . . . are allocated to the third frame of the downlink period.

The radio devices 20 having the hop counts the remainder of which divided by 6 is 3 are allocated to the fourth frame of the downlink period. In other words, the radio devices 20 having the hop counts of 3, 9, 15, 21, . . . are allocated to the fourth frame of the downlink period.

The radio devices 20 having the hop counts the remainder of which divided by 6 is 4 are allocated to the fifth frame of the downlink period. In other words, the radio devices 20 having the hop counts of 4, 10, 16, 22, . . . are allocated to the fifth frame of the downlink period.

The radio devices 20 having the hop counts the remainder of which divided by 6 is 5 are allocated to the sixth frame of the downlink period. In other words, the radio devices 20 having the hop counts of 5, 11, 17, 23, . . . are allocated to the sixth frame of the downlink period.

By performing the processing described above on the downlink period, the radio devices 20 can each allocate its hop count to at least one frame included in the downlink period. Consequently, all the radio devices 20 connected to the network can transmit the downlink data at least once in each downlink period.

By performing the processing described above on each downlink period, the radio devices 20 allocate the hop counts such that the remainder resulted by performing division by the number of frames (N2=Y) included in the downlink period is incremented by 1 from the first frame to the last frame of the downlink period.

To transmit data in the down direction from the radio device 20 having the hop count of 0 (the remainder of which is 0) to the radio device 20 having the hop count of 5 (the remainder of which is 5), for example, the radio communication system 10 can transmit data five times in one downlink period. Consequently, the radio communication system 10 can transmit data generated by the radio device 20 on the upstream to the radio device 20 on the downstream in a short time.

If X is larger than Y, the radio devices 20 may perform the processing of the flowchart illustrated in FIG. 16 not on the downlink period but on the uplink period. In this case, the radio device 20 substitutes X representing the number of frames included in the uplink period for N2 representing the second period at S61. The radio device 20 performs the processing at S61 to S64 by replacing m with n. The radio device 20 allocates the hop count satisfying H % N2=N2−n to the n-th frame included in the second period at S62. In other words, the radio device 20 allocates the hop count, for which the remainder resulted by dividing by N2 is N2−n, to the n-th frame included in the second period. As a result, the radio devices 20 can allocate the hop counts such that the remainder obtained by performing division by the number of frames (N2=X) included in the uplink period decreases by 1 from the first frame to the last frame of the uplink period.

Figure 18:
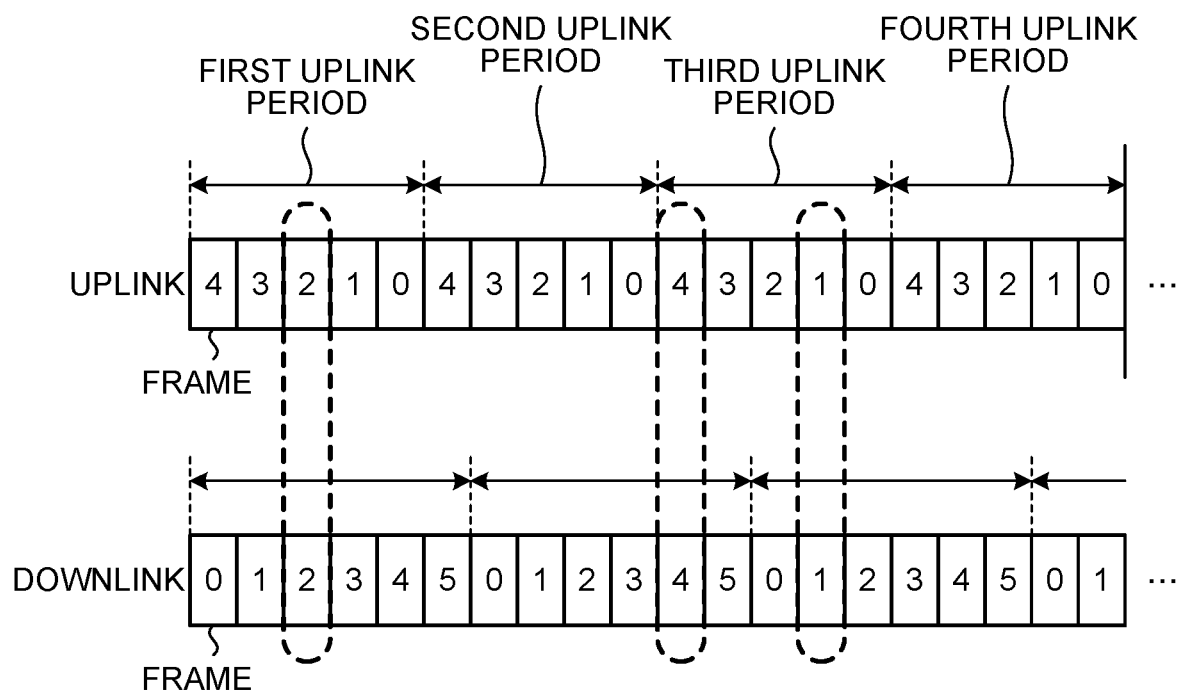
FIG. 18 is a diagram of the simultaneous transmission frames according to the third embodiment.

FIG. 18 is a diagram of an example of the hop counts allocated to the respective frames of the uplink and the downlink according to the third embodiment.

By performing the processing of the flowchart illustrated in FIGS. 8 and 16, the radio devices 20 make the hop count allocated to an arbitrary frame of the X frames included in the uplink period equal to the hop count allocated to the frame coming at the same timing as that of the arbitrary frame in the downlink period. The radio devices 20 vary the position of the arbitrary frame having the same hop count as that allocated to the frame in the downlink period and the hop count allocated thereto depending on the uplink period. FIG. 18 illustrates the simultaneous transmission frames of the radio devices 20 having small hop counts. The radio device 20 having the hop count of 29, for example, can transmit the uplink data and the downlink data in the first frame in the second uplink period.

The radio communication system 10 according to the third embodiment varies the radio device 20 that can transmit data in the simultaneous transmission frame without fixing it. Consequently, the radio communication system 10 according to the third embodiment can reduce power consumption of the radio devices 20.

First Modification

Figure 19:
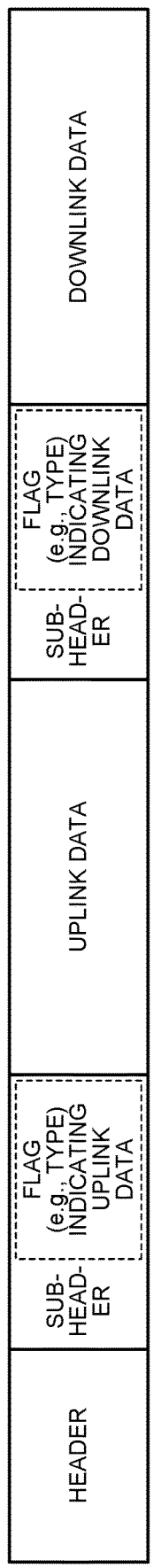
FIG. 19 is a diagram of an example of a packet transmitted from the radio device.

FIG. 19 is a diagram of an example of a packet transmitted from the radio device 20. The radio device 20 according to the first to the third embodiments may collectively transmit the uplink data and the downlink data as a packet. In this case, the radio device 20 transmits by utilizing broadcasting a message packet including entity data to be transmitted in the up direction and entity data to be transmitted in the down direction.

The radio device 20 transmits the message packet not by unicast transmission but by broadcasting transmission, thereby enabling transmitting data to a plurality of destinations, such as both a device to receive the message in the uplink and a device to receive the message in the downlink. The radio device 20 that has received the message packet appropriately extracts the uplink data and the downlink data in the message packet and performs necessary processing, such as relaying the uplink data in the up direction and relaying the downlink data in the down direction.

The message packet includes a header, an upstream sub-header, uplink data, a downstream sub-header, and downlink data. The upstream sub-header is used for identifying the uplink data, and the downstream sub-header is used for identifying the downlink data. If the radio device 20 receives the message packet, the radio device 20 can appropriately extract the uplink data and the downlink data by analyzing the header and the sub-headers.

The message packet simply needs to enable a message receiver to distinguish the uplink data from the downlink data. The message packet does not necessarily have the format illustrated in FIG. 19 and may have other formats. The message packet, for example, may include the header of the entire message including flags for identifying the uplink data and the downlink data or type information for identifying the data type instead of the sub-headers.

Second Modification

Figure 20:
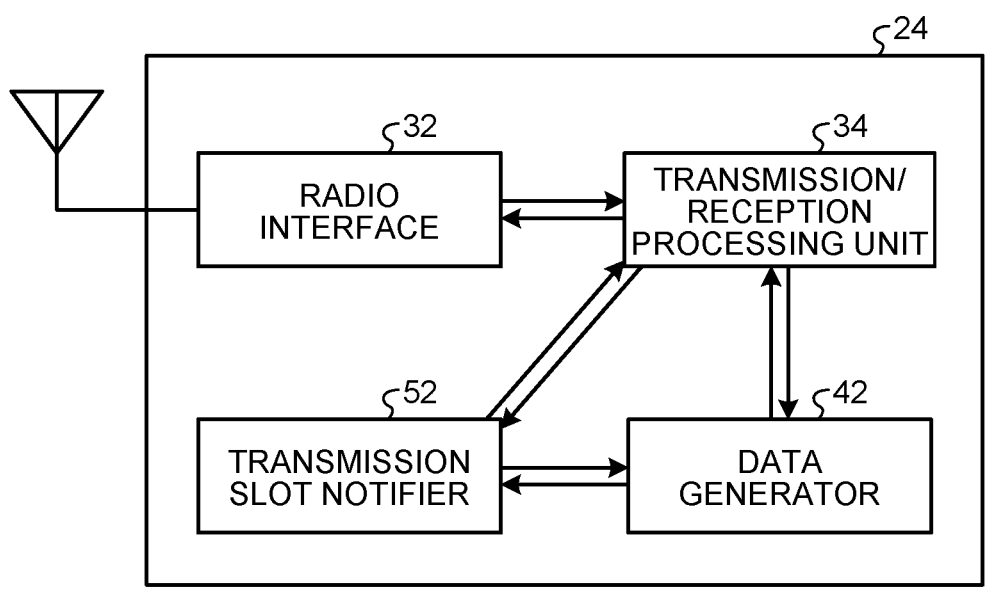
FIG. 20 is a diagram of the configuration of the radio node according to a modification.

FIG. 20 is a diagram of the configuration of the radio node 24 according to a modification. In the radio communication system 10 according to the first to the third embodiments, a plurality of radio devise 20 (the aggregation device 22 and the radio nodes 24) determine the timings of radio transmission according to the same rule (algorithm). In the radio communication system 10 according to the modification, the aggregation device 22 out of the radio devices 20 determines the timings of radio transmission of all the radio devices 20. The aggregation device 22 notifies all the radio devices 20 of the information indicating the timings of radio transmission determined for the respective radio nodes 24.

In this case, the radio node 24 includes a transmission slot notifier 52 instead of the radio node scheduler 40 as illustrated in FIG. 20. The transmission slot notifier 52 acquires and stores therein information indicating the timing of radio transmission transmitted from the aggregation device 22. With this configuration, the radio node 24 can determine the slot and the frame in which it can transmit data in the uplink period and the downlink period. The radio node 24 transmits data in the frame and the slot indicated by the information received from the aggregation device 22.

According to the embodiments described herein, power consumption of a plurality of radio devices can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radio communication system comprising a plurality of radio devices constituting a multi-hop network, wherein each of the radio devices is configured to:
  comprise a hardware processor configured to perform management by synchronizing a timing of a frame including a predetermined number of slots corresponding to a predetermined time length,
  be exclusively associated with at least one of the slots included in the frame,
  enable data to be transmitted in the slot associated with an own radio device in the frame,
  perform management by synchronizing a timing of an uplink period including predetermined X frames and a timing of a downlink period including predetermined Y frames, X being an integer of 2 or larger and Y being an integer of 2 or larger, X and Y being different values,
  allocate a hop count of each radio device of the plurality of radio devices to at least one of the frames in the uplink period and at least one of the frames in the downlink period according to a predetermined rule, the hop count indicating a number of radio devices that transmit data on a shortest path for transmitting the data from the radio device serving as a target to the radio device disposed at a root position,
  in the frame to which the hop count of the own radio device included in the uplink period is allocated, transmit uplink data in the multi-hop network, and
  in the frame to which the hop count of the own radio device included in the downlink period is allocated, transmit downlink data in the multi-hop network,
  wherein
    the hop count allocated to a first frame of the X frames included in a first uplink period as an arbitrary uplink period is made to be same as the hop count allocated to a frame included in the downlink period whose timing is same as a timing of the first frame,
    the hop count allocated to a second frame of the X frames included in a second uplink period as an arbitrary uplink period differing from the first uplink period is made to be same as the hop count allocated to a frame included in the downlink period whose timing is same as a timing of the second frame, and the hop count allocated to the first frame and the hop count allocated to the second frame are made to have different values.

2. The radio communication system according to claim 1, wherein
a first period of one of the uplink period or the downlink period includes N1 frames, N1 being an integer of 2 or larger, and
each of the radio devices allocates the hop count, for which a remainder resulted by dividing by N1 is N1-n, to a n-th frame included in the first period, n being an integer of 1 or larger and N1 or smaller.

3. The radio communication system according to claim 2, wherein
a second period differing from the first period among the uplink period or the downlink period includes N2 frames, and
each of the radio devices is configured to:
allocate the hop count, for which the remainder resulted by dividing by N1 is m−1 to a m-th frame included in the second period, m being an integer of 1 or larger and N2 or smaller).

4. The radio communication system according to claim 3, wherein a larger number of the number of the N1 frames included in the first period and the number of the N2 frames included in the second period is not an integral multiple of a smaller number.

5. The radio communication system according to claim 3, wherein at least one of the number of the N1 frames included in the first period and the number of the N2 frames included in the second period is an odd number.

6. The radio communication system according to claim 2, wherein
a second period differing from the first period among the uplink period or the downlink period includes N2 frames,
each of the radio devices is configured to:
allocate the hop count to the m-th frame, m being an integer of 1 or larger and N2 or smaller, while incrementing m indicating a position of the N2 frames by 1 sequentially from 1 for the second period,
in the allocation of the hop count to the m-th frame,
allocate the hop count, for which the remainder resulted by dividing by N1 is m−1 to the m-th frame if N1-j<m is not satisfied, and
allocate the hop count, for which the remainder resulted by dividing by N1 is m−2, to the m-th frame if N1-j<m is satisfied,
j is a value that is incremented by 1 from 0 to N1-1 for each of the second periods, and
each of the radio devices is configured to repeat the allocation of the hop count for each of N1 second periods.

7. The radio communication system according to claim 2, wherein
a second period differing from the first period among the uplink period or the downlink period includes N2 frames, and
each of the radio devices is configured to:
allocate, to a m-th frame included in the second period, m being an integer of 1 or larger and N2 or smaller, the hop count, for which the remainder resulted by dividing by N1 is equal to or larger by 1 than the remainder allocated to the (m−1)-th frame and allocate the hop count, for which the remainder resulted by dividing by N1 is 0 to N1-1, to any one of the N2 frames included in the second period.

8. The radio communication system according to claim 2, wherein
a second period differing from the first period among the uplink period or the downlink period includes N2 frames, and
each of the radio devices is configured to:
allocate the hop count, for which the remainder resulted by dividing by N1 is m−1, to a m-th frame included in the second period, m being an integer of 1 or larger and N1 or smaller, and
allocate no hop count to (N1+1)-th to N2-th frames included in the second period.

9. The radio communication system according to claim 2, wherein
a second period differing from the first period among the uplink period or the downlink period includes N2 frames, and
each of the radio devices is configured to:
allocate the hop count, for which the remainder resulted by dividing by N2 is m−1, to a m-th frame included in the second period, m being an integer of 1 or larger and N2 or smaller.

10. The radio communication system according to claim 1, wherein each of the radio devices transmits, by utilizing broadcasting, a message packet including entity data to be transmitted in an up direction and entity data to be transmitted in a down direction.

11. A radio device included in a radio communication system comprising a plurality of radio devices constituting a multi-hop network, the radio device comprising:
a hardware processor configured to perform management by synchronizing a timing of a frame including a predetermined number of slots corresponding to a predetermined time length, wherein
the radio device is configured to:
be exclusively associated with at least one of the slots included in the frame,
enable data to be transmitted in the slot associated with an own radio device in the frame,
perform management by synchronizing a timing of an uplink period including predetermined X frames and a timing of a downlink period including predetermined Y frames, X being an integer of 2 or larger and Y being an integer of 2 or larger, X and Y being different values,
allocate a hop count of each radio device of the plurality of radio devices to at least one of the frames in the uplink period and at least one of the frames in the downlink period according to a predetermined rule, the hop count indicating a number of radio devices that transmit data on a shortest path for transmitting the data from the radio device serving as a target to the radio device disposed at a root position,
in the frame to which the hop count of the own radio device included in the uplink period is allocated, transmit uplink data in the multi-hop network, and
in the frame to which the hop count of the own radio device included in the downlink period is allocated, transmit downlink data in the multi-hop network, wherein
the hop count allocated to a first frame of the X frames included in a first uplink period as an arbitrary uplink period is made to be same as the hop count allocated to a frame included in the downlink period whose timing is same as a timing of the first frame, the hop count allocated to a second frame of the X frames included in a second uplink period as an arbitrary uplink period differing from the first uplink period is made to be same as the hop count allocated to a frame included in the downlink period whose timing is same as a timing of the second frame, and the hop count allocated to the first frame and the hop count allocated to the second frame are made to have different values.

12. A computer program product having a non-transitory computer readable medium including programmed instructions, wherein the instructions, when executed by a computer, cause an information processor to function as:

a radio device included in a radio communication system comprising a plurality of radio devices constituting a multi-hop network, wherein the information processor is configured to:

perform management by synchronizing a timing of a frame including a predetermined number of slots corresponding to a predetermined time length, be exclusively associated with at least one of the slots included in the frame, enable data to be transmitted in the slot associated with an own radio device in the frame, perform management by synchronizing a timing of an uplink period including predetermined X frames and a timing of a downlink period including predetermined Y frames, X being an integer of 2 or larger and Y being an integer of 2 or larger, X and Y being different values, allocate a hop count of each radio device of the plurality of radio devices to at least one of the frames in the uplink period and at least one of the frames in the downlink period according to a predetermined rule, the hop count indicating a number of radio devices that transmit data on a shortest path for transmitting the data from the radio device serving as a target to the radio device disposed at a root position, in the frame to which the hop count of the own radio device included in the uplink period is allocated, transmit uplink data in the multi-hop network, and in the frame to which the hop count of the own radio device included in the downlink period is allocated, transmit downlink data in the multi-hop network, wherein the hop count allocated to a first frame of the X frames included in a first uplink period as an arbitrary uplink period is made to be same as the hop count allocated to a frame included in the downlink period whose timing is same as a timing of the first frame, the hop count allocated to a second frame of the X frames included in a second uplink period as an arbitrary uplink period differing from the first uplink period is made to be same as the hop count allocated to a frame included in the downlink period whose timing is same as a timing of the second frame, and the hop count allocated to the first frame and the hop count allocated to the second frame are made to have different values.

* * * * *